June 21, 1966     D. ADOMAITIS     3,256,560
DIE FOR THREE-WAY ORIENTED EXTRUDATE
Filed April 7, 1964
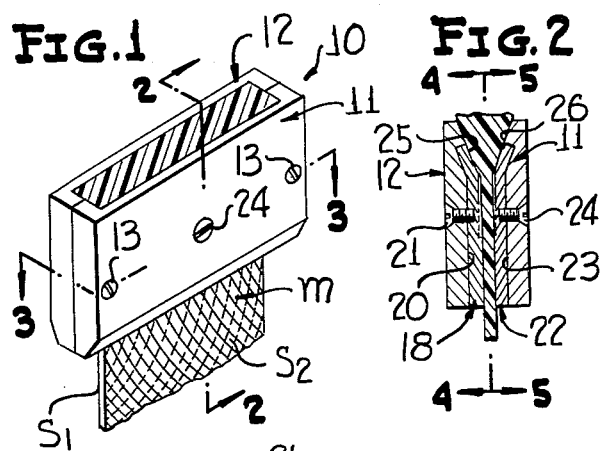
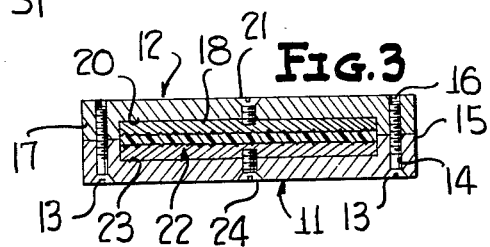
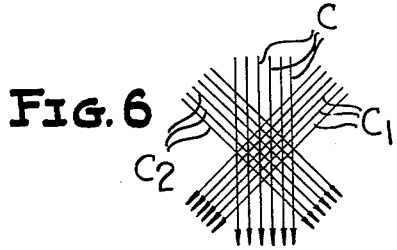
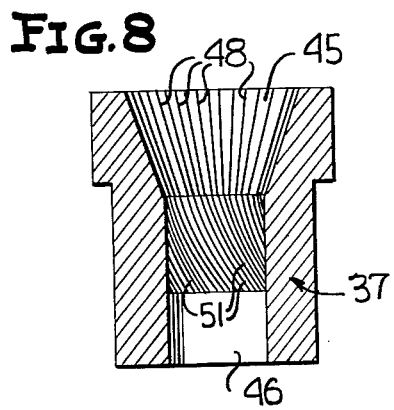
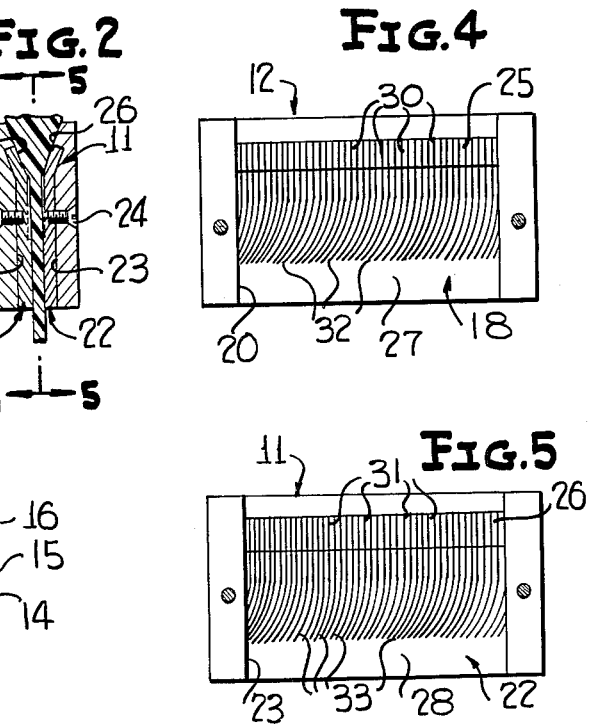
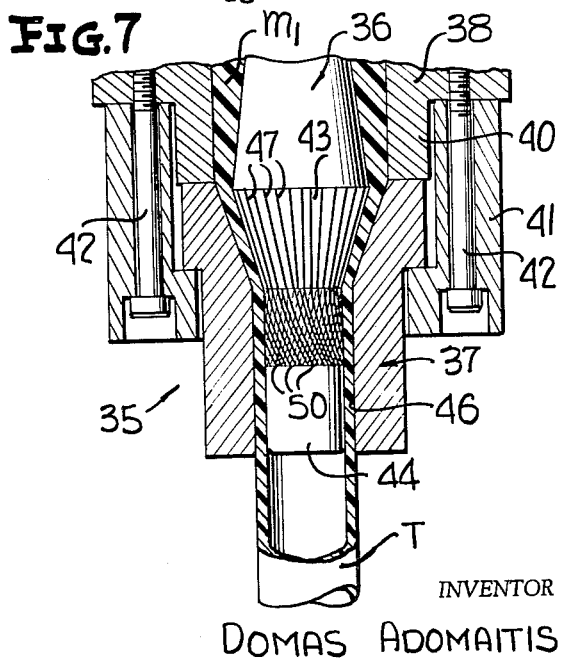
INVENTOR
DOMAS ADOMAITIS
BY
ATTORNEYS

United States Patent Office 3,256,560
Patented June 21, 1966

3,256,560
DIE FOR THREE-WAY ORIENTED EXTRUDATE
Domas Adomaitis, Chicago, Ill., assignor to Continental Can Company, Inc., New York, N.Y., a corporation of New York
Filed Apr. 7, 1964, Ser. No. 357,894
19 Claims. (Cl. 18—12)

This invention relates to a novel die for orienting polymer molecules and/or molecule chains in a mass of continuously extruded polymeric material to form a sandwich structure having opposite surface portions whose molecular chains are oriented in opposite directions and a center portion whose molecular chains are oriented in the direction of flow of the extruded polymeric material.

Heretofore, conventional dies for parison, tube, film or profile extrusion processes have generally included opposed smooth unbroken forming surfaces between which the polymeric material is extruded. During such extrusion of any long chain or linear polymeric material, the molecule chains tend to orient in a random fashion with a major orientation being in the direction of flow. Any articles made by extruding polymeric material between such surfaces of conventional dies evidence unbalanced physical properties because of the unbalanced and generally indiscriminate directional orientation of the polymer chains. Such articles are relatively weak in the direction transverse to the direction of flow and the direction of orientation of the polymeric chains.

An object of this invention is to provide a novel die constructed in a novel manner to overcome the unbalanced directional orientation of molecule chains of substantially all polymeric materials continuously extruded in a conventional manner by providing a plurality of tiny grooves in pre-land and land surface portions of the die to initially pre-orient surface polymeric material in a direction parallel to the direction of flow and thereafter completely orienting the material during its flow between the land surfaces of the die to form a sandwich construction of three layers including a central or midsection oriented in the direction of flow and opposite surface portions or sections in a direction transverse to the direction of flow and opposite to each other.

A further object of this invention is to provide a novel die of the type immediately above described which includes first and second die bodies each of which has opposing grooved land and pre-land surface portions, the opposing surface portions being generally planar, and the grooves in the land surface portions of the opposed bodies being angularly related to the direction of flow of a long chain polymeric material extruded therebetween, and the grooves in opposed surface portions being oppositely angularly directed with respect to each other thereby forming an extruded sheet or film of polymeric material which includes a midportion whose molecule chains are oriented in the direction of flow and whose opposite surface portions are directed transverse to the direction of flow and opposite to each other.

A further object of this invention is to provide a novel die of the type immediately above-described in which the depth of each groove is approximately one-third the depth of the polymeric material extruded between the surfaces of the bodies whereby the extruded sandwich of polymeric material has three layers of equal depth.

A further object of this invention is to provide a novel die for orienting polymeric material in three directions including first and second die bodies having opposing grooved land and pre-land surface portions, the pre-land surface portions being generally conical and the land surface portions being generally cylindrical, the opposing grooves in the pre-land surface portions being arranged in the direction of flow to pre-orient the molecule chains of polymeric material extruded in a conventional manner continuously between the opposed surface portions, and the grooves in the opposing land surface portions of the die bodies being angularly related to the direction of material flow and oppositely directed in relationship to each other to form a generally tubular polymeric member having a central wall section composed of molecule chains oriented in the direction of flow and inner and outer surface portions composed of molecule chains oriented in a direction transverse to the direction of flow and opposite to each other.

With the above, and other objects in view that will hereinafter appear, the nature of the invention will be more clearly understood by reference to the following detailed description, the appended claims and the several views illustrated in the accompanying drawing.

In the drawing:

FIGURE 1 is a fragmentary top perspective view of a novel die of this invention and illustrates a film or sheet of polymeric material being continuously extruded through the die.

FIGURE 2 is a fragmentary sectional view taken along line 2—2 of FIGURE 1, and illustrates a pair of opposing die bodies of the die and the polymeric material being extruded therebetween.

FIGURE 3 is a transverse sectional view taken along line 3—3 of FIGURE 1, and illustrates a plurality of grooves formed in opposing plates carried by each of the die bodies.

FIGURE 4 is a sectional view taken along line 4—4 of FIGURE 2 with the polymeric material removed, and illustrates the arrangement of the plurality of grooves formed in one of the plates of the die body of FIGURE 3.

FIGURE 5 is a sectional view taken along line 5—5 of FIGURE 2 with the polymeric material removed for clarity and illustrates the arrangement of the plurality of grooves in the other of the opposing plates of the die body of this invention.

FIGURE 6 is a schematic view of the molecule chains of the polymeric material shown in FIGURES 1 through 3 of the drawing and graphically illustrates the three-way orientation of the molecule chains.

FIGURE 7 is a fragmentary sectional view partly in elevation of another novel die constructed in accordance with this invention, and illustrates a pair of telescoped grooved die bodies and a continuously extruded tube of polymeric material.

FIGURE 8 is a sectional view of one of the die bodies of FIGURE 7 and clearly illustrates a plurality of grooves in a land surface portion being directed opposite to the plurality of grooves in the land surface portion of the innermost of the telescoped die bodies of FIGURE 7.

A novel die constructed in accordance with this invention is best illustrated in FIGURES 1 through 5 of the drawing and is generally designated by the reference numeral 10.

The die 10 comprises a first die body 11 and a second die body 12. Each of the die bodies 11 and 12 is substantially U-shaped in transverse section (FIGURE 3), and the bodies 11 and 12 are secured in opposed relationship to each other by a plurality of identical screws 13 (FIGURE 3) each received through identical openings 14 in an identical leg or flange 15 of the die body 11 and threadably received in an identical threaded opening 16 of an identical leg or flange 17 of the die body 12.

A rectangular plate or insert 18 (FIGURES 2 through 4) is secured in a substantially rectangular recess 20 of the die body 12 by a plurality of identical screws 21, only one of which is illustrated in the drawing. A substantially rectangular plate or insert 22 (FIGURES 2, 3, and 5) is received in a similar substantially rectangular recess 23 of the die body 11 and is secured therein by one or more of a plurality of identical screws 24, only one of which is illustrated in the drawing.

A pre-land surface portion 25 of the insert 18 opposes a substantially identical pre-land surface 26 of the insert 22 (FIGURES 4 and 5) while a land surface portion 27 of the insert 18 similarly opposes a land surface portion 28 of the insert 22. A first plurality of grooves 30 are formed in the pre-land surface portion 25 of the insert 18 (FIGURE 4) opposing a second plurality of grooves 31 in the pre-land surface portion of the insert 22 (FIGURE 5). The plurality of opposing grooves 30 and 31 in the respective pre-land surface portions 25 and 26 of the respective die bodies 12 and 11 establish a generally linear path of control flow for surface molecular chains of relatively long chain polymeric material M which is continuously extruded in a conventional manner through the die 10. The material M is preferably polyethylene, polystyrene, polypropylene, polyvinylchloride or other similar thermoplastic material.

The purpose of the plurality of grooves 30 and 31 in the respective pre-land surface portions 25 and 26 is to pre-orient the relatively long polymeric molecules (not shown) of the material M in the direction of material flow prior to reaching the land surface portions 27 and 28 of the respective die bodies 12 and 11.

The land surface portions 27 and 28 of the respective inserts 18 and 22 are similarly provided with a plurality of grooves 32 and 33 respectively. Each of the plurality of grooves 32 in the land surface portion 27 of the insert 18 forms a continuation of an associated one of each of the plurality of grooves 30 in the pre-land portion 25, and each of the grooves 32 curves transversely away from the generally linear path of travel of the material M after the passage thereof beyond the pre-land surface portion 25. Thus, the plurality of grooves 32 direct or orient the molecular chains of the polymeric material M at a first surface $S^1$ in a first direction transverse to the linear flow path of the polymeric material M.

Each of the plurality of grooves 33 in the land surface portion 28 of the insert 22 (FIGURE 5) similarly forms a continuation of an associated one of the plurality of grooves 31 in the pre-land surface portion 26 of the die body 11. Each of the plurality of grooves 33 is curved away from the generally linear flow path of the material M and the direction in which the plurality of grooves 33 are curved is opposite to the direction of curvature of the plurality of grooves 32 in the land surface portion 27 of the die body 12. The plurality of grooves 33 thus orient or direct the molecular chains adjacent a surface $S^2$ of the polymeric material M opposite the surface $S^1$ in a direction transverse to the linear flow path of the material M and opposite to the direction of the molecular chains at the surface $S^1$.

This orientation of the molecular chains of the polymeric material is graphically illustrated in FIGURE 6 of the drawing to which attention is now directed. As the material M is extruded between the inserts 18 and 22 of the respective die bodies 12 and 11, the molecular chains are pre-oriented by the opposing plurality of grooves 30 and 31 in a direction substantially parallel to the direction of flow of the material M which is from top-to-bottom as viewed in FIGURES 1 and 2 of the drawing. As the polymeric material M is extruded between the land surface portions 27 and 28 of the respective die bodies 12 and 11, the molecular chains adjacent the surface $S^1$ of the material M are curved from right-to-left as viewed in FIGURE 1 of the drawing by the plurality of grooves 32, and this transverse orientation of the molecule chains is graphically illustrated by the plurality of arrows $C^1$ of FIGURE 6. The polymer molecules or molecule chains adjacent the surface $S^2$ of the polymeric material M are oriented in a direction opposite to the orientation of the molecule chains $C^1$, as is again graphically illustrated in FIGURE 6 by the plurality of arrows $C^2$. The polymeric material between the surfaces $S^1$ and $S^2$ which is unaffected by the plurality of grooves 32 and 33 maintains a substantially parallel linear flow path through the land portions 27 and 28, and the molecule chains in this central portion or section of the polymeric material M remain oriented in the direction of material flow, as is indicated by the plurality of arrows C in FIGURE 6. Thus, the material M extruded through the die body 10 is a sandwich structure having opposite surface portions $S^1$ and $S^2$ composed of polymer molecules and/or molecule chains which are oriented in a direction transverse to the direction of flow, $C^1$ and $C^2$ respectively, while a center or midportion of the sandwich structure is composed of polymer molecules or molecule chains which are oriented in the direction of the arrows C of FIGURE 6 substantially parallel to and in the direction of the flow path of the polymeric material M. By thus orienting the molecule chains of the polymeric material or extrudate M in three different directions, and particularly in two opposite directions transverse to the flow path of the material M, the resultant sandwich structure is equally strong in all directions.

The particular shape, configuration, depth and other characteristics of the plurality of grooves 30 through 33 depends on the particular characteristics of the polymer material being extruded through the die 10, as for example, melt viscosity, wettability, etc. The plurality of grooves 30 through 33 can vary in cross-section from a sharp edged rectangular configuration to a smooth edged rectangular configuration, and a sharp or smooth triangular configuration, an arcuate configuration or similar cross-sectional configurations which are polymer depending. The grooves are, however, preferably smooth and rounded to facilitate material flow.

The grooves 30, 31 can be eliminated and the pre-land surface portions 25 and 26 respectively can be ungrooved and smooth when, for example, polymeric materials which orient very readily is extruded through the die of FIGURES 1–5.

The length of the combined grooves 30 and 32, and the combined grooves 31 and 33 is, again, polymer depending. The combined grooves 30, 32 and 31, 33 are illustrated in a position substantially midway between entrance and exit portions (both unnumbered) of the die 10. However, the grooves 30 and 31 in the respective pre-land surface portions 25 and 26 can extend to the edge of the entrance opening (unnumbered) of the die 10 while the grooves 32 and 33 in the respective land surface portions 27 and 28 can terminate approximately one-sixteenth of an inch from the exit opening (unnumbered) of the die 10.

The depth of the grooves 30 through 33 at any point along the path of material flow ranges from between 0 to ⅓ of the total thickness of the material M at such point. The preferred depth of each of the grooves 30 through 33 is approximately one-third of the thickness of the material M in order that the extruded sandwiched structure is composed of three layers or sections of approximately the same thickness with the polymer molecules or chains oriented in these sections in the manner heretofore described and illustrated in FIGURE 6 of the drawing. The depth of the grooves 32 and 33 preferably decreases gradually to zero in the direction of flow and blends into the ungrooved lower surface portions of the land surface portions 27 and 28.

The width of the grooves 30 through 33 is preferably from between ¹⁄₆₄ to ⅛ inch, and the spacing between adjacent grooves preferably ranges between ¹⁄₆₄ to ¹⁄₁₆ inch.

The curvature of the plurality of grooves 32 and 33 in the respective land portions 27 and 28 relative to the respective grooves 30 and 31, is also, polymer depending. For relatively low viscosity polymers the curvature or bending of the grooves 32 and 33 is more gradual than for relatively higher viscosity polymers. The preferred angle of a tangential line at a lowermost portion of each of the grooves 32 and 33 relative to the straight parallel grooves 30 and 31 and the direction of material flow is generally between 30 degrees to 60 degrees but is preferably approximately 45 degrees.

Another novel die constructed in accordance with this invention is illustrated in FIGURE 7 of the drawing, and is generally designated by the reference numeral 35. The die 35 comprises a first die body or mandrel 36 and a second die body or shell 37. The mandrel 36 projects downwardly through an extrusion nozzle 38 of a conventional extrusion machine (not shown) while the shell 37 is secured to a depending annular projection 40 of the nozzle 38 by a conventional shell retainer 41 and a plurality of identical bolts 42 secured to the nozzle 38 in a conventional manner clearly illustrated in FIGURE 7 of the drawing.

The mandrel 36 of the die 35 comprises a pre-land surface portion 43 which is of a generally inverted truncated conical configuration in elevation. A lowermost generally cylindrical portion of the mandrel 36 defines a land surface portion 44. The pre-land surface portion 43 of the mandrel 36 opposes a pre-land surface portion 45 of the shell 37 (FIGURE 8) which is also substantially of an inverted truncated conical configuration in elevation. The cylindrical land surface portion 44 of the mandrel 36 is in spaced opposed relationship to a cylindrical land surface portion 46 of the shell 37.

A plurality of grooves 47 are formed in the pre-land surface portion 43 of the mandrel 36, and adjacent ones of all of these grooves converge gradually from top-to-bottom as viewed in FIGURE 7 of the drawing. A plurality of substantially identical grooves 48 (FIGURE 8) are similarly formed in the pre-land surface portion 45 of the shell 37, and these grooves 48 similarly converge from top-to-bottom as viewed in FIGURE 8 of the drawing.

A plurality of gradually curving grooves 50 are formed in the land surface portion 44 of the mandrel 36 in opposed spaced relationship to a plurality of curved grooves 51 (FIGURE 8) in the land surface portion 46 of the die body or shell 37. In the form of the invention illustrated in FIGURES 7 and 8 of the drawing, the plurality of grooves 50 in the land surface portion 44 of the mandrel 36 curve in a counterclockwise direction as viewed from above the mandrel 36 in FIGURE 7 while the plurality of grooves 51 in the land surface portion 46 of the shell 37 are curved in a clockwise direction as viewed downwardly from above the shell 37 in both FIGURES 7 and 8 of the drawings.

The plurality of grooves 47 and 48 in the respective pre-land surface portions 43 and 45 cooperate in substantially the same manner as the plurality of grooves 30 and 31 of the die 10 of FIGURES 1 through 3 of the drawing to pre-orient the polymer molecules or molecule chains of polymeric material M¹ in a generally linear direction of flow from top-to-bottom as viewed in FIGURE 7 of the drawing during the conventional continuous extrusion of the material M¹ between the mandrel 36 and the shell 37 to form a tube or parison T. As the material M¹ is extruded between the land surface portions 44 and 46 of the mandrel 36 and the shell 37 respectively, the plurality of opposed oppositely curved grooves 50 and 51 cooperate in the manner heretofore described in the consideration of the grooves 32 and 33 to orient the molecule chains at the inside and outside surfaces of the tube T in the directions corresponding to the plurality of arrows C¹ and C² of FIGURE 6, while a cylindrical central portion of the material of the extruded tube T is oriented in the direction of flow which corresponds to the plurality of arrows C of FIGURE 6 of the drawing. Thus, except for the downwardly converging relationship of the plurality of grooves 47 and 48 and the formation of the tube T when the material M¹ is extruded through the die 35, the plurality of grooves 47, 48, 50 and 51 correspond substantially identically in function and structure to the grooves 30 through 33 of the die 10 of FIGURES 1 through 5 of the drawing. However, since the land surface portions 46 and 44 are substantially cylindrical, the molecule chains are, in effect, wound helically in opposite directions at the inner and outer surfaces of the tube T while no such winding occurs in the polymer material M, as is best illustrated in FIGURE 1 of the drawing.

In both the die 10 and the die 35, the plurality of grooves have been disclosed as being preferably formed entirely along both the land and pre-land surface portions. However, a die constructed in accordance with this invention for conventional profile extrusion of thermoplastic material may be selectively grooved or partly grooved, and total grooving of such dies may be unnecessary.

It is also considered within the scope of this invention to reverse the direction of curvature of the plurality of grooves 50 and 51 in the respective cylindrical land surface portions 44 and 46 of the die 35.

The width of the grooves 47 and 48 in the mandrel 36 and the shell 37 respectively may also be gradually decreased from top-to-bottom as viewed in FIGURES 7 and 8 as the surface area of the pre-land surface portions 43 and 45 decrease at the lower end portions thereof.

From the foregoing, it will be seen that novel and advantageous provisions have been made by carrying out the desired end. However, attention is again directed to the fact that additional variations may be made in this invention without departing from the spirit and scope thereof as defined in the appended claims.

I claim:

1. A die for three-way oriented extrudate comprising first and second die bodies, each of said bodies having opposing land and pre-land surface portions, a first plurality of grooves in the pre-land surface portions of each of said bodies, said first plurality of grooves establishing a generally linear path of controlled flow for surface chains of long chain polymeric material extruded between said bodies, a second plurality of grooves in the land surface portions of said die bodies, the second plurality of grooves in the land surface portion of said first die body being angularly related to the first plurality of grooves in the pre-land surface portion of the first die body, the second plurality of grooves in the land surface portion of said second die body being angularly related to the first plurality of grooves in the pre-land surface portion of said second die body and the second plurality of grooves in the land surface portion of the first die body being directed opposite to the direction of the second plurality of grooves in the second die body whereby the molecule chains of the extrudate are oriented in three different directions upon the passage thereof through the die.

2. The die as defined in claim 1 wherein the grooves in the pre-land surface portions are related to the grooves in the land surface portions by an angle of between 30 to 60 degrees whereby the opposing grooves in the land surface portions are directed oppositely one another by an angle of between 60 to 120 degrees.

3. The die as defined in claim 1 wherein the depth of each of the grooves is approximately one-third the distance between opposing groove bottoms in the first and second die bodies whereby the material extruded between the bodies has three layers of approximately the same thickness with the polymer chains oriented in three directions.

4. The die as defined in claim 1 wherein the width of each groove is approximately 1/64 to 1/8 inch and the spacing between grooves is approximately 1/64 to 1/16 inch.

5. The die as defined in claim 2 wherein the depth of each of the grooves is approximately one-third the distance between opposing groove bottoms in the first and second die bodies whereby the material extruded between the bodies has three layers of approximately the same thickness with the polymer chains oriented in three directions.

6. The die as defined in claim 2 wherein the width of each groove is approximately $1/64$ to $1/8$ inch and the spacing between grooves is approximately $1/64$ to $1/16$ inch.

7. The die as defined in claim 2 wherein the depth of each of the grooves is approximately one-third the distance between opposing groove bottoms in the first and second die bodies whereby the material extruded between the bodies has three layers of approximately the same thickness with the polymer chains oriented in three directions, the width of each groove being approximately $1/64$ to $1/8$ inch and the spacing between grooves is approximately $1/64$ to $1/16$ inch.

8. The die as defined in claim 2 wherein the land and pre-land surface portions are substantially planar.

9. The die as defined in claim 2 wherein the pre-land surface portions are substantially conical and the land surface portions are substantially cylindrical.

10. The die as defined in claim 7 wherein the land and pre-land surface portions are substantially planar.

11. The die as defined in claim 7 wherein the pre-land surface portions are substantially conical and the land surface portions are substantially cylindrical.

12. A die for three-way oriented extrudate comprising first and second die bodies, said die bodies being secured in opposing relationship, a recess in each of said die bodies, first and second inserts removably secured in said recesses, said inserts having opposing land and pre-land surface portions, a first plurality of grooves in the pre-land surface portion of each of said inserts, said first plurality of grooves establishing a generally linear path of controlled flow for surface chains of long chain polymeric material extruded between said inserts, a second plurality of grooves in the land surface portions of said inserts, the second plurality of grooves in the land surface portion of said first insert being angularly related to the first plurality of grooves in the pre-land surface portion of the first insert, the second plurality of grooves in the land surface portion of the second insert being angularly related to the first plurality of grooves in the pre-land surface portion of said second insert, and the second plurality of grooves in the land surface portion of the first insert being directed opposite to the direction of the second plurality of grooves in the second insert whereby the molecule chains of the extrudate are oriented in three different directions upon the passage thereof through the die.

13. The die as defined in claim 12 wherein the grooves in the pre-land surface portions are related to the grooves in the land surface portions by an angle of between 30 to 60 degrees whereby the opposing grooves in the land surface portions are directed oppositely one another by an angle of between 60 to 120 degrees.

14. The die as defined in claim 12 wherein the depth of each of the grooves is approximately one-third the distance between opposing groove bottoms in the first and second die bodies whereby the material extruded between the bodies has three layers of approximately the same thickness with the polymer chains oriented in three directions.

15. The die as defined in claim 12 wherein the grooves in the pre-land surface portions are related to the grooves in the land surface portions by an angle of between 30 to 60 degrees whereby the opposing grooves in the land surface portions are directed oppositely one another by an angle of between 60 to 130 degrees, the depth of each of the grooves being approximately one-third the distance between opposing groove bottoms in the first and second die bodies whereby the material extruded between the bodies has three layers of approximately the same thickness with the polymer chains oriented in three directions.

16. A die for three-way oriented extrudate comprising first and second die bodies, each of said bodies have opposing land and pre-land surface portions, said pre-land surface portions being smooth and establishing a generally predetermined path of controlled flow for polymeric material extruded between said bodies, a plurality of grooves in the land surface portions of said die bodies, said plurality of grooves in the land surface portion of said first die body being directed opposite to the direction of the plurality of grooves in the second die body whereby long molecule chains of long chain polymeric material extruded between the bodies are oriented in three different directions upon the passage thereof through the die.

17. The die as defined in claim 16 wherein the grooves in the land surface portions of each of the bodies are related to the predetermined path of the extruded polymeric material by an angle of between 30 to 60 degrees whereby the opposing grooves in the land surface portions are directed oppositely one another by an angle of between 60 to 120 degrees.

18. The die as defined in claim 16 wherein the depth of each of the grooves in the land surface portions of the die body is approximately $1/3$ the distance between opposing groove bottoms in the first and second die bodies whereby the material extruded between the bodies has three layers of approximately the same thickness with the polymeric chains oriented in three directions.

19. The die as defined in claim 18 wherein the width of each groove is approximately $1/64$ to $1/8$ inch and the spacing between grooves is approximately $1/64$ to $1/16$ inch.

References Cited by the Examiner

UNITED STATES PATENTS

| | | | |
|---|---|---|---|
| 1,444,911 | 2/1923 | Goodenberger | 18—12 |
| 1,607,623 | 11/1926 | Higgins | 264—108 |
| 1,665,342 | 4/1928 | Borsenberger | 25—17 |
| 1,700,208 | 1/1929 | Paisseau | 264—108 |
| 2,149,006 | 2/1939 | Orsini | 264—108 X |
| 2,398,506 | 4/1946 | Rogers | 264—2 |
| 2,683,897 | 7/1954 | Patterson | 25—17 X |
| 2,919,467 | 1/1960 | Mercer | 18—13 |
| 2,932,551 | 4/1960 | Mentsch | 25—17 X |

WILLIAM J. STEPHENSON, *Primary Examiner.*